UNITED STATES PATENT OFFICE.

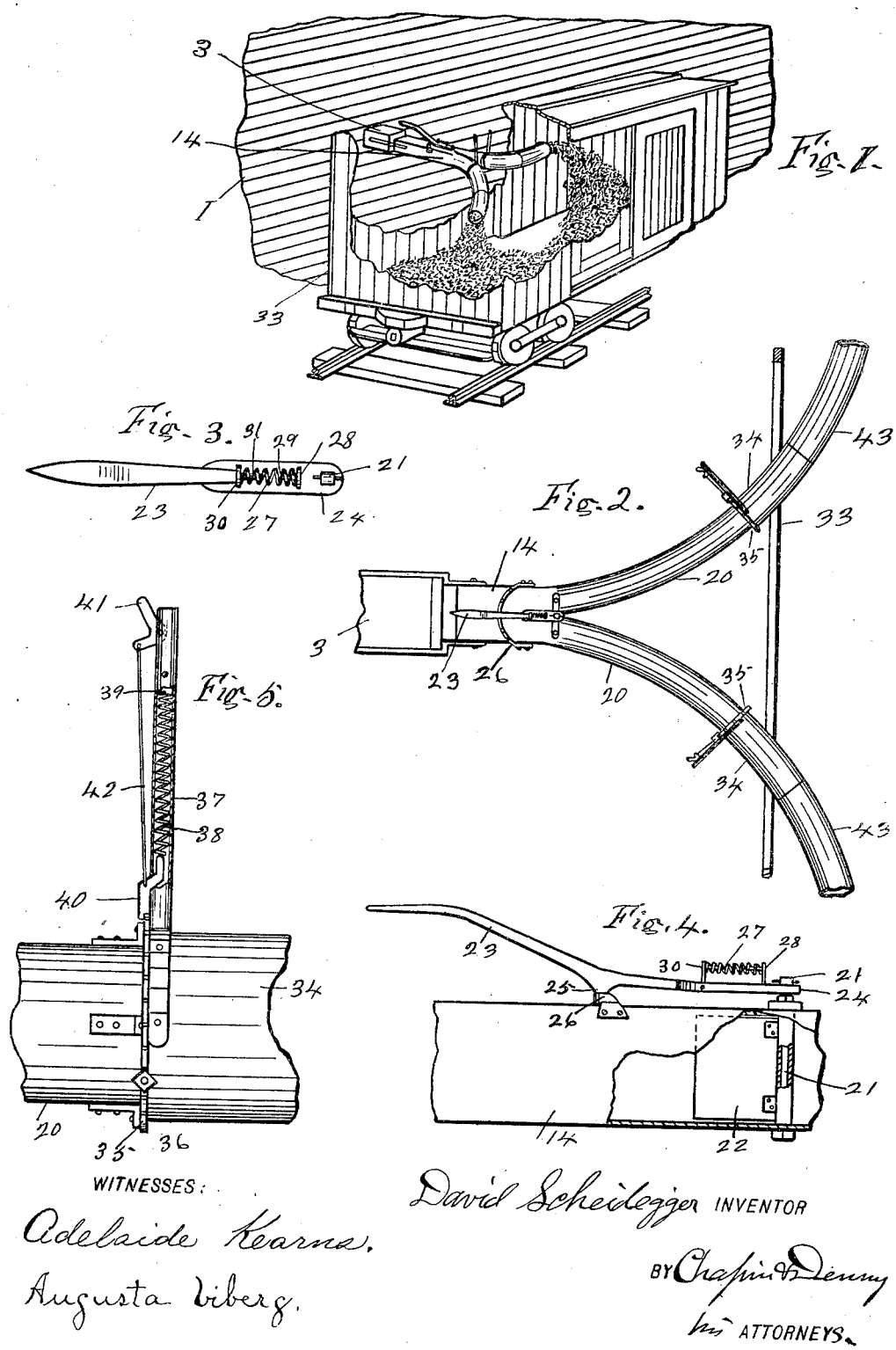

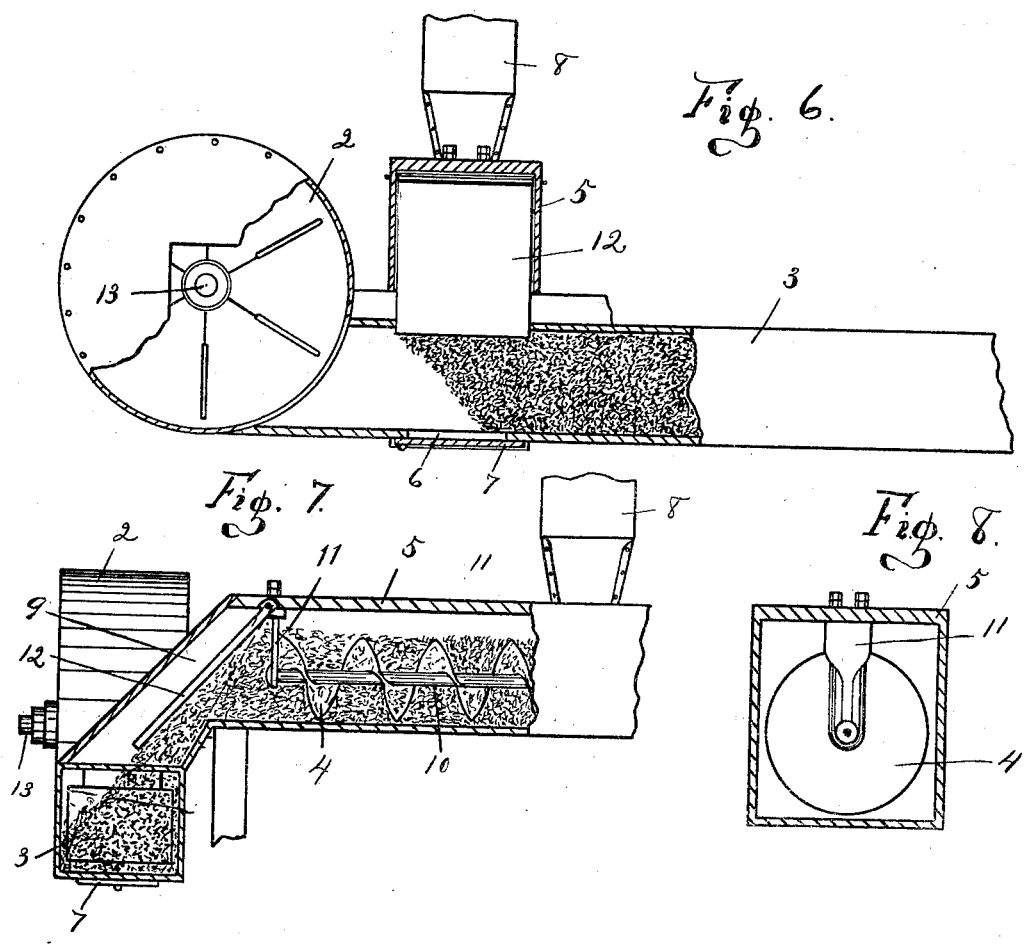

DAVID SCHEIDEGGER, OF WOODBURN, INDIANA.

PNEUMATIC GRAIN-CONDUCTING APPARATUS.

SPECIFICATION forming part of Letters Patent No. 672,409, dated April 16, 1901.

Application filed July 2, 1900. Serial No. 22,283. (No model.)

*To all whom it may concern:*

Be it known that I, DAVID SCHEIDEGGER, a citizen of the United States, residing at Woodburn, in the county of Allen, in the State of Indiana, have invented certain new and useful Improvements in Pneumatic Grain-Conducting Apparatus; and I do hereby declare that the following is a full, clear, and exact description of the invention, which will enable others skilled in the art to which it appertains to make and use the same, reference being had to the accompanying drawings, which form part of this specification.

My invention relates to improvements in pneumatic grain-conducting apparatus specially designed and adapted for loading freight-cars from elevators.

It is well known that the loading of small grain, as wheat and oats, from railway-elevators into box freight-cars is now generally done by arranging a fan-blower at a suitable point within the car in coöperative relation with the outer end of an inclined chute leading from a suitable hopper within the elevator. This requires that the blower and its belted actuating mechanism be set up and taken down upon the loading of each car, which occasions considerable inconvenience and much loss of time.

The object of my present invention is to provide an improved grain-conducting apparatus for the loading of freight-cars of simple and economical construction, adapted to be detachably connected to a stationary blower located within the grain-elevator and in coöperative relation with a fixed grain-chute, thereby obviating the necessity of readjusting or re-setting the blower for the loading of each car.

My improvement consists of a conveyer rotatably mounted in a conveyer-chute provided at its inner end with a suitable hopper and discharging at its outer end downward into a fixed grain-spout having at its inner end a suitable blower adapted to force a current of air through the spout to carry and deliver the grain and a detachable bifurcated grain-spout having adjustable and removable diverging pipe-sections for delivering and distributing the grain to and within both ends of the car simultaneously.

The principal novel feature of my invention is the construction and arrangement whereby it can readily be adjusted for each car successively without disturbing the blower or its actuating mechanism.

In the accompanying drawings similar reference-numerals indicate like parts throughout the several views, in which—

Figure 1 is a perspective view of my improvement in position for use, the blower being fixed within a suitable building whose adjacent wall is shown in section and broken away, the diverging ends of the detachable bifurcated delivery-spout being arranged within the car and shown in the act of loading. Fig. 2 is a plan view of the bifurcated delivery-spout, showing the means for adjusting the diverging ends of the delivery-pipes broken away. Fig. 3 is a detail plan of the means for regulating the relative distribution of the grain through the said delivery-pipes; and Fig. 4 is a side view of the same in position on the spout, partly broken away. Fig. 5 is an enlarged detail of the means for adjusting and securing the adjacent ends of the said pipe-sections. Fig. 6 is a side view of the blower-fan and the grain-spout, partly broken away, and also showing a cross-section of the conveyer-chute immediately in front of the deflector. Fig. 7 is another view of the same, showing the conveyer-chute broken away and the said spout in cross-section. Fig. 8 is an end view of the conveyer in position in the conveyer-chute.

At any convenient or desired location within the grain-elevator 1 is located a blower 2, of any proper and well-understood construction, properly inclosed, as shown, arranged in coöperative connection with the grain-spout 3 and at the outer end thereof, Fig. 6. This spout 3 has in its lower face a suitable opening 6 for affording access to the interior thereof for cleaning the same. This opening is closed by a suitable hinged lid 7.

The discharge-spout 3, of any suitable form, has its outer end protruding slightly from a suitable opening in the elevator-wall, Fig. 1, and has near its inner end a proper conveyer 4, revolubly mounted in a conveyer-chute 5, which is arranged at right angles to the said spout 3 and is adapted to discharge therein.

The conveyer-chute 5 is provided upon its free end with a proper hopper 8, adapted to receive the grain intended for delivery, Fig.

7, and has its other end connected to the spout 3 by the inclined chute 9.

The conveyer 4 is fixed upon a proper horizontal shaft 10, whose opposite ends are revolubly mounted in suitable pendent hangers 11, supported from the top of the chute 5. The open end of the chute 5 is normally closed by an oblique deflector 12, pivotally mounted at its upper end in any suitable manner and having its lower end swinging free, as shown, and guides the grain downward.

The current of air from the blower has a tendency to ascend the chute 9 and force light grain, like oats, back, and thus choke the conveyer, and the deflector counteracts this effect by receiving the current upon its upper surface, which not only diverts the current, but presses the deflector against the descending grain and makes it more compact to overcome the force as it falls into the grain-spout.

The conveyer-shaft 10 and the blower-shaft 13 are both actuated in any proper manner.

To the protruding end of spout 3 is detachably secured the delivery-spout 14 in any suitable manner.

In Figs. 2 and 4 is shown my improved means for regulating the relative distribution of grain from the spout 14 to the divergent arms 20, comprising the following instrumentalities: In suitable coincident vertical openings in the said spout 14 at or near the bifurcation is revolubly mounted the upright shaft 21, which is square in cross-section in that portion within the spout 14. On this shaft is fixed a guide 22, which is thus laterally adjustable by means of the operating-handle 23, whose forward end is rigidly secured to the upper protruding end of said shaft 21. This lever-handle 23 is two-part. Its forward portion consists of a horizontal plate 24, whose inner end is bifurcated and adapted to pivotally secure the forward end of the handle portion 23, which is provided with a pendent nib or detent 25, adapted to form a holding engagement with the curved rack 26, rigidly fixed on the said spout 14, Fig. 2. The handle 23 is firmly held in its holding engagement with the said rack-bar by means of the coil-spring 27, which is arranged as follows: On the said plate 24 is fixed the short upright post 28, having upon the inner face of its upper end a short pin or lug 29. On the inner end of the handle 23 is fixed a similar post 30, having a similar pin 31. On these two pins is loosely mounted the said coil-spring 27. Obviously the disengagement of the handle 23 must be made against the tension of the said spring 27, which thereby tends to hold the handle to its engagement.

In Fig. 1 is shown a freight-car 33, broken away in part, in the act of loading from the adjacent elevator, broken away, showing the manner of delivering the grain simultaneously to both ends of the car. To the outer ends of the said arms 20 are secured the detachable and revolubly-adjustable pipe-sections 34, which pass through the door to the interior of the car. The means for detachably securing the sections 34 is shown in detail in Fig. 5, and is described as follows: Near the outer end of the said arms 20 is rigidly fixed a semicircular rack-bar 35 by means of a metal strap 46 in a well-understood manner. At a suitable place on the adjacent end of the pipe-section 34 is rigidly fixed a radial spring-pressed latch consisting of a tubular casing 37 and a coil-spring 38, loosely mounted in said casing, with its upper end bearing against a fixed block 39 and its lower end bearing against the upper end of the catch 40. To the upper end of the said casing 37 is pivoted an operating-handle 41, which is pivotally connected with the said catch 40 by means of the rod 42. The said catch 40 is thus normally held in engagement with the said rack 35 by the tension of the spring 38 and can be readily disengaged therefrom by pulling on the said handle 41, after which the said sections 34 can be rotatably adjusted at the pleasure of the operator to suit the progress of filling the car. The said pipe-sections 34 are, of course, of a sufficient diameter to fit tightly over the said arms 20. The outer ends of the said sections 34 may be provided with any additional sections 43 desired, which are fitted on by telescoping, like joints of stovepipe.

The manner of employing my improvement thus described is, briefly stated, as follows: When it is desired to load grain from the elevator into freight-cars, the bifurcated delivery-spout is placed in position on the fixed chute 3 in such relation to the track that the cars will pass it freely, as shown in Fig. 2. Each car is then successively brought forward into position. The detachable sections 34 are then adjusted upon the outer ends of the said sections 20, with their inner ends projecting into the car, Figs. 1 and 2. Additional sections 43 may be added, if desired. By means of the guide 22 and operating-handle 23 the relative supply of grain to the respective delivery-sections 20 may be conveniently regulated. As each car is loaded the detachable sections 34 can readily be removed and conveniently replaced for the next car. It is obvious, therefore, that a very important feature of my improvement is that it can quickly and conveniently be adjusted for removal from a loaded car and for replacement in an empty car.

It is obvious that the spout 14, having a single adjustable arm, can distribute the discharging grain instead of using divergent arms.

Having thus described my invention, what I desire to secure by Letters Patent is—

1. In a pneumatic grain-conducting apparatus the combination of a chute; a blower connected to one end thereof; a hopper communicating with said chute; a detachable bifurcated grain-spout having divergent arms and provided with a laterally-adjustable guide for regulating the relative distribution of the grain to the said divergent arms; detachable pipe-sections for the said arms; and means for adjustably securing the said sections to the said arms.

2. The combination in a grain-loading apparatus of a delivery-chute; a blower connected to one end of said chute; a hopper discharging into said chute intermediate of the said blower and the delivery end of the said chute; a detachable bifurcated grain-spout having an adjustable guide for the purpose specified, and provided with a pair of divergent arms as shown; detachable pipe-sections for the said arms; and means for adjustably securing the said sections to the said arms.

3. The combination in a grain-loading apparatus of a delivery-chute; a blower connected to one end of said chute; a hopper discharging into said chute intermediate of the said blower and the delivery end of said chute, a pivoted deflector arranged as shown to prevent the back action of the air-blast as described; a detachable grain-spout; detachable pipe-sections for said spout, and means for adjustably securing the said sections to the said spout.

Signed by me at Fort Wayne, Allen county, State of Indiana, this 30th day of June, A. D. 1900.

DAVID SCHEIDEGGER.

Witnesses:
ADELAIDE KEARNS,
ALICE KEARNS.